United States Patent
Yang et al.

(10) Patent No.: US 12,226,910 B2
(45) Date of Patent: Feb. 18, 2025

(54) TASK EXECUTION METHOD AND APPARATUS FOR ROBOTS CAPABLE OF FREELY CONSTRUCTING NETWORK, AND STORAGE MEDIUM

(71) Applicant: SYRIUS ROBOTICS CO., LTD., Guangdong (CN)

(72) Inventors: Zhiqin Yang, Guangdong (CN); Hua Huang, Guangdong (CN); Xiangyu Wang, Guangdong (CN)

(73) Assignee: SYRIUS ROBOTICS CO., LTD., Guangdong (CN)

( * ) Notice: Subject to any disclaimer, the term of this patent is extended or adjusted under 35 U.S.C. 154(b) by 283 days.

(21) Appl. No.: 17/788,751

(22) PCT Filed: Dec. 4, 2020

(86) PCT No.: PCT/CN2020/133720
§ 371 (c)(1),
(2) Date: Jun. 24, 2022

(87) PCT Pub. No.: WO2021/129344
PCT Pub. Date: Jul. 1, 2021

(65) Prior Publication Data
US 2023/0034278 A1 Feb. 2, 2023

(30) Foreign Application Priority Data

Dec. 26, 2019 (CN) .......................... 201911368776.8

(51) Int. Cl.
*B25J 9/16* (2006.01)
*G05B 19/418* (2006.01)
*G08G 1/127* (2006.01)

(52) U.S. Cl.
CPC ........... *B25J 9/1682* (2013.01); *B25J 9/1674* (2013.01); *G05B 19/41895* (2013.01);
(Continued)

(58) Field of Classification Search
CPC ........ B25J 9/1679; B25J 9/1674; B25J 9/162; B25J 9/1656; B25J 9/1661;
(Continued)

(56) References Cited

U.S. PATENT DOCUMENTS 9,008,839 B1 * 4/2015 Kuffner, Jr. ........ G05B 19/4187
700/248
2006/0095160 A1 5/2006 Orita et al.
(Continued)

FOREIGN PATENT DOCUMENTS

| CN | 1870658 A | 11/2006 |
|---|---|---|
| CN | 104808671 A | 7/2015 |

(Continued)

OTHER PUBLICATIONS

Drenjanac et al., Harnessing coherence of area decomposition and semantic shared spaces for task allocation in a robotic fleet, 2014, Information Processing in Agriculture, Science Direct (Year: 2014).*

(Continued)

*Primary Examiner* — Russell Frejd
*Assistant Examiner* — Sara J Lewandroski
(74) *Attorney, Agent, or Firm* — Samson G. Yu

(57) ABSTRACT

A task execution method and apparatus for robots capable of freely constructing a network, and a storage medium are provided. The method includes: partitioning, by a server, an entire region of a warehouse to obtain local region(s) corresponding to the partitioned warehouse (S10); receiving capability feature information reported by each robot moving freely within a current warehouse range after the robot comes online (S20); determining, according to the capability feature information reported by the robot, a local center robot, and assigning corresponding to-be-executed task(s) to the local region obtained via the partitioning, such that robot(s) freely constructing a local network execute the (Continued)

to-be-executed task(s) (S30); and after the robot(s) have completed the to-be-executed task(s), receiving task completion information reported by a robot, and releasing the robot to be a free moving robot (S40).

17 Claims, 3 Drawing Sheets

(52) U.S. Cl.
CPC .. *G05B 19/418* (2013.01); *G05B 2219/39078* (2013.01); *G08G 1/127* (2013.01)

(58) Field of Classification Search
CPC ........... G05B 2219/40282; G05B 2219/40298; G05B 2219/40174; G05B 2219/40233; G05B 2219/40306; G05B 2219/39146; G05B 2219/36459; G05B 2219/39078; G05B 2219/39209; G05B 2219/40089; G05B 2219/40113; G05B 2219/40115; G05B 2219/40154; G05B 2219/40178; G05B 2219/40213; G05B 2219/40437; G05B 2219/40518; G05B 2219/40519; G05B 2219/39382; G05B 2219/31391; G05B 2219/32037; G05B 19/4189; G05B 19/41895; G05B 19/418; G05B 19/41815; G05B 19/41835; G05B 19/4185; G05B 19/41855; G05B 19/41865; G08G 1/123; G08G 1/127; G08G 1/20; G08G 1/202; G08G 1/205; G08G 1/207; G08G 1/22; G06Q 10/08; G06Q 10/087; G06Q 10/0631; G06Q 10/06311; G06Q 10/063112; G06Q 10/063114; G06Q 10/063118; G06Q 10/06312; G06Q 10/06313; G06Q 10/06315; G06Q 10/06316; B65G 1/0407; B65G 1/0414; B65G 1/04121; B65G 1/0428; B65G 1/0435; B65G 1/0485; B65G 1/0492; B65G 1/06; B65G 1/065; B65G 1/12; B65G 1/137; B65G 1/1371; B65G 1/1373; B65G 1/1375; B65G 1/1376; B65G 1/1378

See application file for complete search history.

(56) References Cited

U.S. PATENT DOCUMENTS

| | | | |
|---|---|---|---|
| 2018/0314241 A1 | 11/2018 | Park | |
| 2019/0094870 A1* | 3/2019 | Afrouzi | ............... G05D 1/0274 |
| 2020/0301432 A1* | 9/2020 | Bose | ................... G06Q 10/087 |

FOREIGN PATENT DOCUMENTS

| | | | | | |
|---|---|---|---|---|---|
| CN | 107077651 A | | 8/2017 | | |
| CN | 108202965 A | | 6/2018 | | |
| CN | 108227654 A | | 6/2018 | | |
| CN | 108398924 A | | 8/2018 | | |
| CN | 108416488 A | | 8/2018 | | |
| CN | 108469786 A | | 8/2018 | | |
| CN | 108958202 A | | 12/2018 | | |
| CN | 109426560 A | * | 3/2019 | ............... | G06F 9/50 |
| CN | 109814556 A | | 5/2019 | | |
| CN | 110009209 A | | 7/2019 | | |
| CN | 110032158 A | | 7/2019 | | |
| IN | 101364921 A | | 2/2009 | | |
| JP | 2013257735 A | | 12/2013 | | |
| JP | 2017107456 A | | 6/2017 | | |
| WO | 2018081207 A1 | | 5/2018 | | |

OTHER PUBLICATIONS

Sen et al., Distributed Allocation of Workflow Tasks in MANETs, Report No. WUSCE-2007-41 (2007), All Computer Science and Engineering Research, Washington University in St. Louis (Year: 2007).*

First Office Action of the counterpart JP Application No. 2022-538326 issued on Jul. 24, 2023.

* cited by examiner

TASK EXECUTION METHOD AND APPARATUS FOR ROBOTS CAPABLE OF FREELY CONSTRUCTING NETWORK, AND STORAGE MEDIUM

CROSS REFERENCE

This application is a National Stage Filing of the PCT International Application No. PCT/CN2020/133720 filed on Dec. 4, 2020, which claims priority to Chinese Application No. 201911368776.8 filed on Dec. 26, 2019, the entirety of which is herein incorporated by reference.

TECHNICAL FIELD

The present disclosure relates to the technical field of Internet, and in particular, to a task execution method and apparatus for robots capable of freely constructing a network, and a storage medium.

BACKGROUND

With the popularization of an Internet technology, the continuous development and progress of the economy, and the popularity and popularization of online shopping, express and warehousing industries are rapidly developed accordingly, and corresponding requirements for warehouse picking are higher and higher. In order to increase the picking efficiency in a warehouse, many manufacturers have added a robot-assisted picking system in addition to traditional manual picking. By means of the robot-assisted picking system, a robot can automatically receive a picking task order and moves to a warehouse storage location where commodities to be picked are stored to wait for an operator. The operator picks the corresponding commodities according to prompts and confirms completion of the current picking task. Then the robot automatically moves to a next picking location to further assist in the next picking task. Therefore, the picking efficiency is increased.

In practical applications, due to considerations in cost and scale, many warehouses may be located in remote locations, and network environments in the warehouse are also unstable. As a result, the robot cannot keep stable communication with a server all the time under such environments, and thus cannot report the current picking situation in real time and cannot immediately request tasks from the server while idle.

In view of the above situations, a processing method in the related art is to upgrade infrastructures of the warehouse so that the robot can keep stable communication with the server at any location of the warehouse. However, this solution may be expensive, the larger the warehouse, the higher the cost, and the higher the required communication quality, the higher the cost. In an environment where a communication condition of a large-scale warehouse is poor, the robot may need to run a very long distance to establish a communication with the server for reporting task execution situations, and needs to move to a specific location after each execution, resulting in low efficiency. Therefore, how to make the robots distributed in different locations in the warehouse work efficiently and improve the overall picking efficiency has become a difficult problem.

SUMMARY

Embodiments of the present disclosure provide a task execution method and apparatus for robots capable of freely constructing a network, and a storage medium, which can enable robots in different locations in a warehouse to work efficiently and improve overall task execution efficiency.

Some embodiments of the present disclosure provide a task execution method for robots capable of freely constructing a network, including the following operations.

A server partitions an entire region of a warehouse to obtain at least one local region corresponding to the partitioned warehouse.

The server receives capability feature information that is reported by each robot moving freely within a current warehouse range after the robot comes online.

The server determines a local center robot according to the capability feature information reported by the robot, and assigns one or more to-be-executed tasks corresponding to the local region obtained via partitioning, so that one or more robots freely constructing a local network execute the one or more to-be-executed tasks.

The server receives task completion information reported by a robot after the one or more robots complete the one or more to-be-executed tasks, and releases the robot which has reported the task completion information to be a free moving robot.

Some embodiments of the present disclosure further provide a task execution apparatus for robots capable of freely constructing a network, including a warehouse region partitioning module, a to-be-executed task assignment module, and a robot releasing module.

The warehouse region partitioning module is configured to partition an entire region of a warehouse to obtain at least one local region corresponding to the partitioned warehouse according to a warehouse range where robots currently work and communication capability information of the robots.

The to-be-executed task assignment module is configured to receive capability feature information that is reported by each robot moving freely within a current warehouse range after the robot comes online; and determine a local center robot according to the capability feature information reported by the robot, and assign one or more to-be-executed tasks corresponding to the local region obtained via partitioning, so that one or more robots freely constructing a local network execute the one or more to-be-executed tasks.

The robot releasing module is configured to receive task completion information reported by a robot after the one or more robots complete the one or more to-be-executed tasks, and release the robot which has reported the task completion information to be a free moving robot.

Some embodiments of the present disclosure further provide an electronic device. The electronic device includes a memory and a processor. The memory stores a task execution program executable on the processor. When the task execution program is executed by the processor, the task execution method for robots capable of freely constructing a network is executed.

Some embodiments of the present disclosure further provide a computer storage medium. The computer storage medium stores a task execution program. The task execution program is executed by one or more processors to implement operations of the task execution method for robots capable of freely constructing a network.

The task execution method and apparatus for robots capable of freely constructing a network, and a storage medium can achieve the following beneficial effects.

The entire region of the warehouse is partitioned to obtain at least one local region corresponding to the partitioned warehouse. The capability feature information that is reported by each robot moving freely within the current warehouse range after the robot comes online is received. The local center robot is determined according to the capability feature information reported by the robot, and the corresponding to-be-executed task is assigned to the local region obtained via partitioning, so that one or more robots freely constructing a local network execute the one or more to-be-executed tasks. The task completion information reported by a robot is received after the one or more robots complete the one or more to-be-executed tasks, and the robot which has reported the task completion information is released to be the free moving robot. Therefore, the robots in different locations in the warehouse can work efficiently and the overall task execution efficiency can be increased without additional costs.

BRIEF DESCRIPTION OF THE DRAWINGS

The accompanying drawings are used to provide a further understanding of the present disclosure, and constitute a part of the specification, which are used to explain the present disclosure with the embodiments of the present disclosure, and do not constitute a limitation of the present disclosure. In the drawings.

DETAILED DESCRIPTION OF THE EMBODIMENTS

The exemplary embodiments of the present disclosure will be described below with reference to the accompanying drawings. It should be understood that the exemplary embodiments described here are merely used to illustrate and explain the present disclosure, and are not used to limit the present disclosure.

The present disclosure provides a task execution method and apparatus for robots capable of freely constructing a network, and a storage medium, which can enable robots in different locations in a warehouse to work efficiently and improve overall task execution efficiency.

Figure 1:
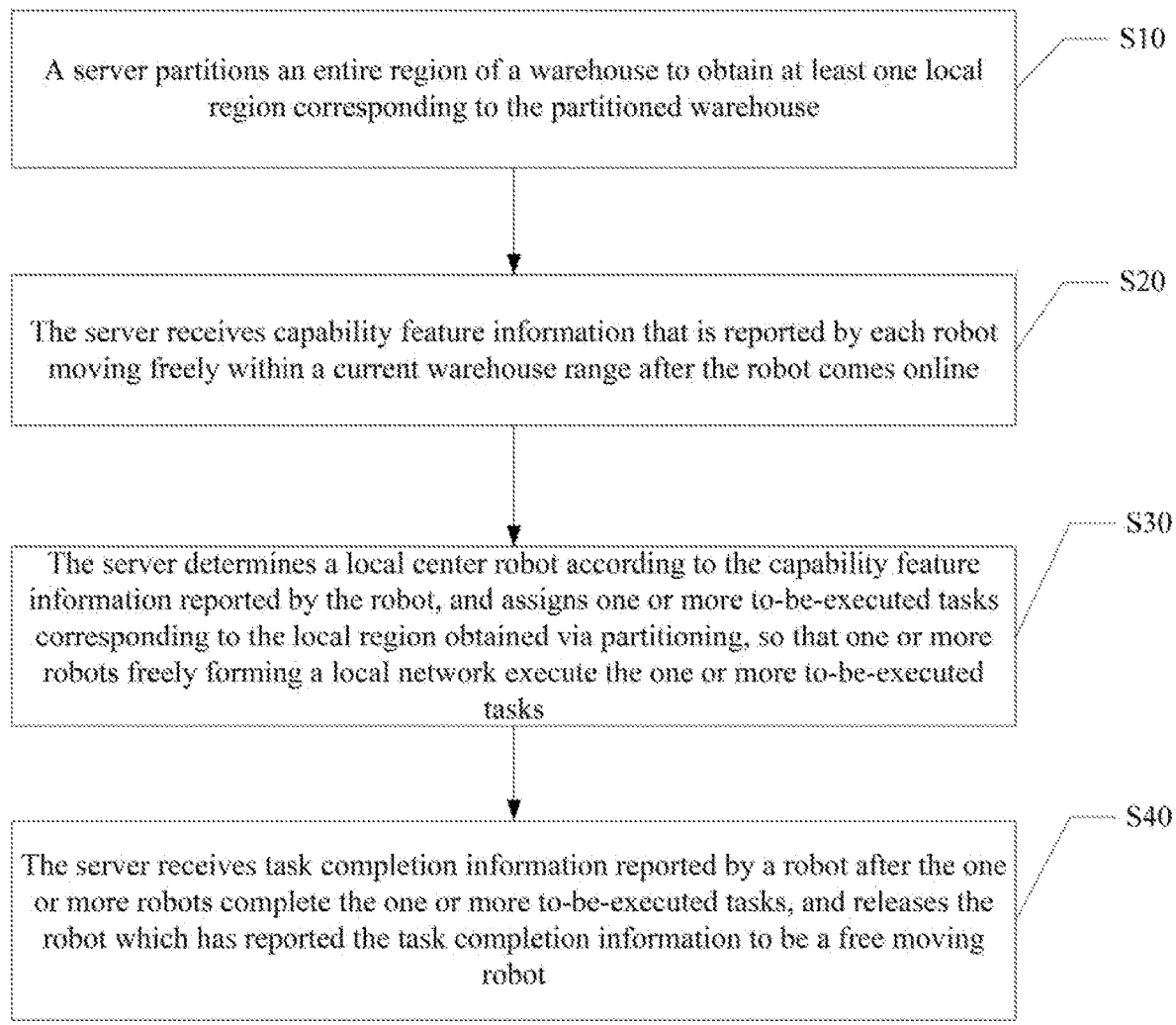
FIG. 1 is a schematic flowchart of a task execution method for robots capable of freely constructing a network according to an embodiment of the present disclosure.

As shown in FIG. 1, FIG. 1 is a schematic flowchart of a task execution method for robots capable of freely constructing a network according to an embodiment of the present disclosure. The task execution method for robots capable of freely constructing a network in an embodiment of the present disclosure may be implemented as S10 to S40 as described below.

At S10, a server partitions an entire region of a warehouse to obtain at least one local region corresponding to the partitioned warehouse.

Considering that the robots distributed in different locations in the warehouse work efficiently without additional network deployment costs, this embodiment of the present disclosure is implemented by using a manner of partitioning the region of the warehouse. That is to say, the server needs to partition a large warehouse into several regions in which the robots can directly conduct communication.

In this embodiment of the present disclosure, the server partitions the region of the warehouse according to a warehouse range where robots currently work and communication capability information of the robots. That is to say, the partitioning of the region of the warehouse is based on a size of the warehouse and the communication capability of the robots. Definitely, in an exemplary application scenario, other partitioning methods may also be adopted according to specific actual situations. In this embodiment of the present disclosure, the specific partitioning method of the region of the warehouse is not exhaustive or limited one by one. The purpose of partitioning the entire region of the warehouse to obtain the partitioned local regions is to guarantee that all of the robots in each local region can conduct communication, thereby keeping efficient operation and enhance task execution efficiency.

After the server partitions the entire warehouse into several local regions, tasks required to be executed in the same local region are formed into a local task package corresponding to the local region.

For example, the size of the entire warehouse is 200*100 square meters, and the communication range of a robot is 100 meters. Then, the entire warehouse is partitioned into a region A and a region B, and the size of both A and B is 100*100 square meters. That is to say, the robots in one region can directly conduct communication. The to-be-executed tasks are also processed according to the region. That is to say, the to-be-executed tasks are also partitioned as tasks of the region A and tasks of the region B. For example, there are 30 picking tasks (T1 to T30) in the region A, and there are 70 picking tasks (T31 to T100) in the region B.

At S20, the server receives capability feature information that is reported by each robot moving freely within a current warehouse range after the robot comes online.

At S30, the server determines a local center robot according to the capability feature information reported by the robot, and assigns one or more to-be-executed tasks corresponding to the local region obtained via partitioning, so that one or more robots freely constructing a local network execute the one or more to-be-executed tasks.

After the robot comes online, the robot automatically moves. When the robot can communicate with the server, the capability of the current robot is reported. Then the server decides which robot becomes the local center robot according to a current task situation and the capability of each robot, and sends the entire local task package to the robot.

That is to say, the robot automatically moves in the warehouse after coming online. When the robot moves to a location with an internet connection, the communication capability of the current robot and a current state of the robot are reported to the server. The server receives capability feature information that is reported by each robot moving freely within the current warehouse range after the robot comes online, and decides whether to determine the robot as the local center robot according to a certain rule. Once the local center robot is determined, the current local task package is sent to the corresponding local center robot. During free moving, the robot records which locations can the robot conduct communication with the server, and the strength of a communication signal when communicating with the server. Then, after determining that the one or more tasks in the local task package in the local region are all completed, the local center robot moves to the location with the internet connection to report the task execution situation to the server.

For example, each robot automatically moves after coming online, and reports the capability to the server after moving to a communication point (C1). The reported capability information includes types of tasks that the robot is able to accept, a current health condition of the robot, and the like. During automatic moving, each robot saves the location information of the communication point, so as to perform task execution report to the server when needed later.

At S40, the server receives task completion information reported by a robot after the one or more robots complete the one or more to-be-executed tasks, and releases the robot which has reported the task completion information to be a free moving robot.

In this embodiment of the present disclosure, when the one or more robots complete the one or more tasks, the reported task completion information received by the server is sent by the local center robot. After the one or more to-be-executed tasks in the local task package sent to the local center robot by the server are all completed, the local center robot moves to a location where the local center robot can conduct communication and reports the completion of all of the local tasks to the server. In this case, the local center robot is released. The released robot becomes a free robot, which may automatically move in the warehouse. The robot still attempts to communicate with the server or with other robots during moving, acquires a task for execution, and executes S10 to S40 in a loop.

For data reporting problems of the robot to the server, any robot may upload task data to the server as long as passing through a network location where the robot can conduct communication with the server or a preset specific data acquisition point, and the task information does not need to be reported by the local center robot until the execution of all the tasks is completed. When the robot reports data to the server, the reporting manner includes, but is not limited to, reporting via a network, or via other near field communication technologies, such as scanning and uploading, Bluetooth, NFC, RFID, or the like.

Further, in an embodiment, the determination of the local center robot may be implemented according to the following manners.

A network communication situation is detected by each robot when the robot freely moves within the current warehouse range after the robot comes online, communication information between the robot and the server and between the robot and other robots is acquired to obtain the capability feature information of the robot, and the obtained capability feature information is reported to the server. In addition, the robot records location information of the communication point where the robot is capable of communicating with the server.

The server respectively determines a corresponding local center robot for each local region corresponding to the partitioned warehouse according to the capability feature information reported by the robot and a preset assignment rule. For example, the server determines one of the robots to be the local center robot of the current local region according to the current task situation and the capability of each robot. For example, in an exemplary application scenario, assuming that there are four robots currently in the same local region, which are respectively R1, R2, R3, and R4. The capabilities of the four robots include receiving tasks and executing the tasks. In addition, scores corresponding to the health conditions of the robots are respectively 90, 85, 80, and 75.

During moving, the robots R1, R2, R3, and R4 attempt to communicate with the server. Then, the server issues the tasks of the region A to the robot R1, and the tasks of the region B to the robot R2 according to the current task situation and the actual capability and health condition of each robot. 30 picking tasks (T1 to T30) of the region A are assigned to R1, and 70 tasks (T31 to T100) of the region B are assigned to R2.

After the local center robot is determined, the server extracts the local task package corresponding to the local region, and sends the local task package to the corresponding local center robot assigned for the local region. Then, the local center robot assigns one or more to-be-executed tasks to task execution robots, other than the local center robot, in the local region.

In an embodiment, the process that respective robots in the local region automatically construct a network may be implemented according to the following manners.

In a case where a robot encounters the local center robot when the robot freely moves, the robot conducts robot-to-robot communication with the local center robot to construct the local network with the local center robot in the corresponding local region, wherein robots in the same local network complete the local task package corresponding to the local region cooperatively.

The local center robot assigns one or more to-be-executed tasks corresponding to the local task package to the task execution robots in the local region according to a preset task assignment rule, and each task execution robot executes at least one to-be-executed task corresponding to the task execution robot.

For example, during automatic moving in the warehouse, in addition to detection of the network situation and attempting of communication with the server, the robot also communicates with other robots by using a robot-to-robot communication manner (including, but not limited to, Wi-Fi, Bluetooth, and the like), and reports the capability and state of the current robot. When encountering with the local center robot, the robot establishes a communication with the local center robot, and reports the state of the current robot. Then, the local center robot sends the one or more tasks in the current task package to other robots for execution according to a preset rule, so that these robots getting the one or more tasks become the task execution robots in the local region. In this way, the robots that cooperatively execute the to-be-executed tasks corresponding to the local task package in the local region form the local network, thereby cooperatively completing the set of local tasks.

For example, R1 receives information from R3 after obtaining the local task package, and then R1 sends the tasks to R3. If R3 determines to execute the tasks, R1 and R3 form the local network to cooperatively execute the task package of the region A. Likewise, R2 and R4 form the local network of the region B to cooperatively execute the tasks of the region B.

During execution of the task, the task execution robot reports the current task execution situation to the local center robot in the same local region in real time while executing the task. For example, the robots R1 and R3 move to a position where the region A is located to execute the tasks (T1 to T30) of the region A, and R2 and R4 move to a position where the region B is located to execute the tasks (T31 to T100) of the region B. then, results of task execution are respectively reported to R1 and R2.

After the task execution robot executes the to-be-executed task, in a case where there is still at least one to-be-executed task in the corresponding local task package in the same local region, the local center robot continuously sends at least one to-be-executed task to the task execution robot.

In a case where the one or more to-be-executed tasks in the corresponding local task package in the same local region are all completed, the local center robot moves, according to recorded location information of a communication point where the local center robot is capable of communicating with the server, to a corresponding location of the communication point, and reports that the one or more to-be-executed tasks in the local task package in the local region are all completed to the server. In this case, the local center robot is released to be the free moving robot.

In a case where there are no other robots cooperating with the local center robot to complete the one or more to-be-executed tasks within a preset duration after the local center robot acquires the local task package, the local center robot moves, according to recorded location information of a communication point where the local center robot is capable of communicating with the server, to a corresponding location of the communication point, and feeds back, to the server, that the one or more to-be-executed tasks in the local region are unable to be executed, so as to release the one or more to-be-executed tasks corresponding to the local region.

For example, in an exemplary application scenario, the robot R1 is online and automatically moves in the warehouse, and obtains the task package (T1 to T30) of the region A after moving to the communication point C1 where the robot R1 communicates with the server. The robot R2 is online and automatically moves in the warehouse, and obtains the task package (T31 to T100) of the region B after moving to the communication point C1 where the robot R2 communicates with the server. The robot R3 is online and automatically moves in the warehouse, and encounters R1 and establishes the communication during moving so as to obtain the task T1. The robot R4 is online and automatically moves in the warehouse, and encounters R2 and establishes the communication during moving so as to obtain the task T31. The robots R1 and R3 move to the region A to execute the task package (T1 to T30) of the region A, and the robots R2 and R4 move to the region B to execute the task package (T31 to T100) of the region B. The robot R3 reports a task execution result to R1 every time R3 executes a task. When there are still tasks required to be executed, R1 assigns a next task to R3, until all of the tasks of the region A are executed. Then, R3 is released to become a free robot, and automatically moves in the warehouse.

After executing the tasks of the region A, R1 moves to the communication point C1 to report the execution situation of the task package (T1 to T30) of the region A to the server. In this case, R1 is released to become a free robot. If there is no new task currently, R1 continuously freely moves in the warehouse. The robots R1 and R3 successively move to the region B when freely moving in the warehouse, and establish a communication with the robot R2. In this case, the tasks of the region B are not completely executed yet. Then, R2 sends the tasks to R1 and R3, and R1 and R3 become the task execution robots in the task network of the region B. the task execution robots R1, R3, and R4 report the task execution situation to the center robot R2 in real time during task execution. Then, R2 successively assigns the tasks of the region B to each robot for execution, until all of the tasks of the region B are completely executed. When there is no task, the robots R1, R3, and R4 are released to become free robots.

After executing the tasks of the region B, R2 moves to the communication point C1 to report the execution situation of the task package (T31 to T100) of the region B to the server. In this case, R2 is released to become a free robot to continuously freely move in the warehouse.

Through the technical solution described in this embodiment of the present disclosure, a huge warehouse may be partitioned into many smaller local regions, and there is a set of robots in each local region to complete the tasks in the local region. When the tasks are completely executed, these robots are released again, and may be added into other local networks. Each local network may communicate with each other in real time. Therefore, efficient operation of each robot in the local network can be guaranteed through close cooperation. In addition, in this technical solution, the infrastructures in the warehouse do not need to be transformed, so that additional costs are not added. Furthermore, a method for locally partitioning an operation region and a method for the robots to freely construct the network can be easily extended to other application scenarios.

It is to be noted that, the communication manner between the server and each robot described in this embodiment of the present disclosure includes, but is not limited to, Wi-Fi, HTTP, and the like, and any manners that may conduct communication can be used. In addition, the robot-to-robot communication manner includes, but is not limited to, Wi-Fi, Bluetooth, and the like, and any manners that may conduct communication can be used.

According to the task execution method for robots capable of freely constructing a network in the present disclosure, the server partitions the entire region of the warehouse to obtain at least one local region corresponding to the partitioned warehouse. The server receives the capability feature information that is reported by each robot moving freely within the current warehouse range after the robot comes online. The server determines the local center robot according to the capability feature information reported by the robot, and assigns one or more to-be-executed tasks corresponding to the local region obtained via partitioning, so that one or more robots freely constructing a local network execute the one or more to-be-executed tasks. The server receives the task completion information reported by a robot after the one or more robots complete the one or more to-be-executed tasks, and releases the robot which has reported the task completion information to be the free moving robot. Therefore, the robots in different locations in the warehouse can work efficiently and the overall task execution efficiency can be increased without additional costs.

Figure 2:
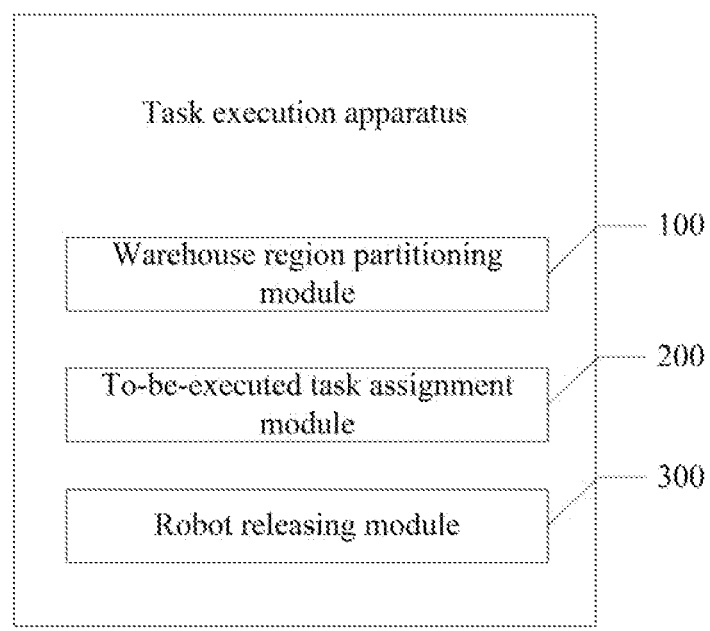
FIG. 2 is a schematic diagram of function modules of a task execution apparatus according to an embodiment of the present disclosure.

Corresponding to the task execution method for robots capable of freely constructing a network described in the embodiment in FIG. 1, an embodiment of the present disclosure further provides a task execution apparatus for robots capable of freely constructing a network. As shown in FIG. 2, FIG. 2 is a schematic diagram of function modules of a task execution apparatus according to an embodiment of the present disclosure. In this embodiment of the present disclosure, the task execution apparatus is only partitioned functionally and includes a warehouse region partitioning module 100, a to-be-executed task assignment module 200, and a robot releasing module 300.

The warehouse region partitioning module 100 is configured to partition an entire region of a warehouse to obtain at least one local region corresponding to the partitioned warehouse according to a warehouse range where robots currently operate and communication capability information of the robots.

The to-be-executed task assignment module 200 is configured to receive capability feature information that is reported by each robot moving freely within a current warehouse range after the robot comes online; and determine a local center robot according to the capability feature information reported by the robot, and assign one or more to-be-executed tasks corresponding to the local region obtained via partitioning, so that one or more robots freely constructing a local network execute the one or more to-be-executed tasks.

The robot releasing module 300 is configured to receive task completion information reported by a robot after the one or more robots complete the one or more to-be-executed tasks, and release the robot which has reported the task completion information to be a free moving robot.

Based on the description of the task execution method for robots capable of freely constructing a network in the embodiment described in FIG. 1, in an embodiment, the task execution apparatus for robots capable of freely constructing a network further includes robots 400.

Each robot 400 is configured to perform the following operations.

Each robot detects a network communication situation when the robot freely moves within the current warehouse range after the robot comes online, acquires communication information between the robot and the server and between the robot and other robots to obtain the capability feature information of the robot, and reports the obtained capability feature information to the server.

Location information of a communication point where the robot is capable of communicating with the server is recorded.

In an embodiment, the robot 400 is configured to perform the following operations.

Each robot detects a network condition while the robot is online and freely moves within the current warehouse range, and the robot attempts to communicate with the server. Communication with other robots is performed according to a preset robot-to-robot communication manner.

The capability feature information of the robot is acquired according to the communication information between the robot and the server and between the robot and other robots.

In an embodiment, the to-be-executed task assignment module 200 is configured to perform the following operations.

A corresponding local center robot is determined for each local region corresponding to the partitioned warehouse according to the capability feature information reported by the robot and a preset assignment rule.

A local task package is sent to the corresponding local center robot assigned for the local region, and the local center robot assigns one or more to-be-executed tasks to task execution robots, other than the local center robot, in the local region.

The local network is constructed among the local center robot and the task execution robots in the same local region.

In an embodiment, the robot 400 is configured to perform the following operations.

In a case where a robot encounters the local center robot when the robot freely moves, the robot conducts robot-to-robot communication with the local center robot to form the local network with the local center robot in the corresponding local region, wherein robots in the same local network complete the local task package corresponding to the local region cooperatively.

The local center robot assigns one or more to-be-executed tasks corresponding to the local task package to the task execution robots in the local region according to a preset task assignment rule, and each task execution robot executes at least one to-be-executed task corresponding to the task execution robot.

In an embodiment, the robot 400 is configured to perform the following operations.

A current task execution situation is reported to the local center robot in the same local region in real time while the task execution robot executes the to-be-executed task.

After the task execution robot executes the to-be-executed task, in a case where there is still at least one to-be-executed task in the corresponding local task package in the same local region, the local center robot continuously sends at least one to-be-executed task to the task execution robot.

In a case where the one or more to-be-executed tasks in the corresponding local task package in the same local region are all completed, the local center robot moves, according to recorded location information of a communication point where the local center robot is capable of communicating with the server, to a corresponding location of the communication point, and reports that the one or more to-be-executed tasks in the local task package in the local region are all completed to the server. In this case, the local center robot is released to be the free moving robot.

In an embodiment, the task execution robot in the robot 400 is configured to perform the following operations.

In a case where there are no other robots cooperating with the local center robot to complete the one or more to-be-executed tasks within a preset duration after the local center robot acquires the local task package, the local center robot moves, according to recorded location information of a communication point where the local center robot is capable of communicating with the server, to a corresponding location of the communication point, and feeds back, to the server, that the one or more to-be-executed tasks in the local region are unable to be executed, so as to release the one or more to-be-executed tasks corresponding to the local region.

According to the task execution apparatus for robots capable of freely constructing a network in the present disclosure, the entire region of the warehouse is partitioned to obtain at least one local region corresponding to the partitioned warehouse. The capability feature information that is reported by each robot moving freely within the current warehouse range after the robot comes online is received. The local center robot is determined according to the capability feature information reported by the robot, and the corresponding to-be-executed task is assigned to the local region obtained via partitioning, so that one or more robots freely constructing a local network execute the one or more to-be-executed tasks. The task completion information reported by a robot is received after the one or more robots complete the one or more to-be-executed tasks, and the robot which has reported the task completion information is released to be the free moving robot. Therefore, the robots in different locations in the warehouse can work efficiently and the overall task execution efficiency can be increased without additional costs.

Figure 3:
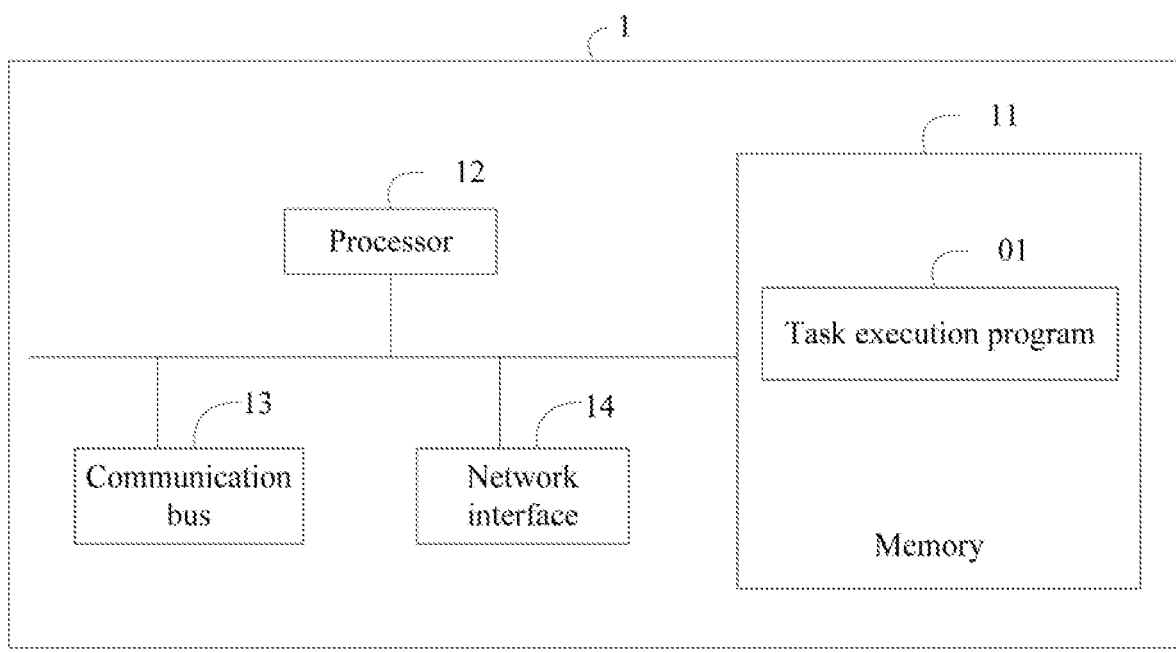
FIG. 3 is a schematic diagram of an internal structure of an electronic device according to an implementation of present disclosure.

The present disclosure further provides an electronic device. The electronic device can execute corresponding tasks according to the task execution method for robots capable of freely constructing a network described in FIG. 1. As shown in FIG. 3, FIG. 3 is a schematic diagram of an internal structure of an electronic device according to an embodiment of the present disclosure.

In this embodiment, the electronic device 1 may be a Personal Computer (PC), or a terminal device, such as a smart phone, a tablet computer and a portable computer. The electronic device 1 at least includes a memory 11, a processor 12, a communication bus 13 and a network interface 14.

The memory 11 includes at least one type of readable storage medium. The readable storage medium includes a flash memory, a hard disk, a multimedia card, a card-type memory (for example, an SD or DX memory, etc.), a magnetic memory, a magnetic disk, an optical disk, and the like. The memory 11 may be an internal storage unit of the electronic device 1 in some embodiments, such as a hard disk of the electronic device 1. In some other embodiments, the memory 11 may also be an external storage device of the electronic device 1, such as a plug-in hard disk, a Smart Media Card (SMC), and a Secure Digital (SD), a Flash Card, and the like equipped on the electronic device 1. Further, the memory 11 may further include both the internal storage unit of the electronic device 1 and the external storage device. The memory 11 can be configured not only to store application software and various types of data installed in the electronic device 1, such as a code of a task execution program 01, but also to temporarily store data that has been output or will be output.

In some embodiments, the processor 12 may be a Central Processing Unit (CPU), a controller, a microcontroller, a microprocessor or other data processing chips, and is configured to operate a program code or processing data stored in the memory 11, such as execution of the task execution program 01.

The communication bus 13 is configured to conduct connection communication between these assemblies.

Optionally, the network interface 14 may include a standard wired interface and a wireless interface (such as a WI-FI interface), and is usually configured to establish a communication connection between the electronic device 1 and other electronic devices.

Optionally, the electronic device 1 may also include a user interface. The user interface may include a display and an input unit, such as a keyboard. The optional user interface may also include the standard wired interface and the wireless interface. Optionally, in some embodiments, the display may be a Light-Emitting Diode (LED) display, a liquid crystal display, a touch liquid crystal display, an OLED touch device, etc. The display can also be appropriately called a display screen or a display unit, and is configured to display the information processed in the electronic device 1 and to display a visualized user interface.

FIG. 3 only shows the electronic device 1 with assemblies 11 to 14 and the task execution program 01. Those skilled in the art can understand that a structure shown in FIG. 2 does not constitute a limitation on the electronic device 1, and may include fewer or more components than that in the shown figures, or the combination of certain components, or different component arrangements.

Based on the description of the embodiments in FIG. 1 and FIG. 2, in an embodiment of the electronic device 1 shown in FIG. 3, the memory 11 stores the task execution program 01. The task execution program 01 stored on the memory 11 may be executed on the processor 12. The following operations are implemented when the task execution program 01 is executed by the processor 12.

A server partitions an entire region of a warehouse to obtain at least one local region corresponding to the partitioned warehouse.

The server receives capability feature information that is reported by each robot moving freely within a current warehouse range after the robot comes online.

The server determines a local center robot according to the capability feature information reported by the robot, and assigns one or more to-be-executed tasks corresponding to the local region obtained via partitioning, so that one or more robots freely constructing a local network execute the one or more to-be-executed tasks.

The server receives task completion information reported by a robot after the one or more robots complete the one or more to-be-executed tasks, and releases the robot which has reported the task completion information to be a free moving robot.

In an embodiment, the following operations may be further implemented when the task execution program 01 is executed by the processor 12.

Each robot detects a network communication situation when the robot freely moves within the current warehouse range after the robot comes online, acquires communication information between the robot and the server and between the robot and other robots to obtain the capability feature information of the robot, and reports the obtained capability feature information to the server.

The robot records location information of a communication point where the robot is capable of communicating with the server.

In an embodiment, the task execution program 01 may further be executed by the processor 12. The operation that the network communication situation is detected by each robot when the robot freely moves within the current warehouse range after the robot comes online, communication information between the robot and the server and between the robot and other robots is acquired to obtain the capability feature information of the robot includes the following operations.

Each robot detects a network condition while the robot is online and freely moves within the current warehouse range, and the robot attempts to communicate with the server. Communicating with other robots is performed according to a preset robot-to-robot communication manner.

The capability feature information of the robot is acquired according to the communication information between the robot and the server and between the robot and other robots.

In an embodiment, the task execution program 01 may further be executed by the processor 12. The operation of determining, by the server, the local center robot according to the capability feature information reported by the robot, and assigning one or more to-be-executed tasks corresponding to the local region obtained via partitioning, so that robots freely constructing the local network execute the one or more to-be-executed tasks includes the following operations.

The server respectively determines a corresponding local center robot for each local region corresponding to the partitioned warehouse according to the capability feature information reported by the robot and the preset assignment rule.

A local task package is sent to the corresponding local center robot assigned for the local region, and the local center robot assigns one or more to-be-executed tasks to task execution robots, other than the local center robot, in the local region.

The local network is constructed among the local center robot and the task execution robots in the same local region.

In an embodiment, the following operations may be further implemented when the task execution program 01 is executed by the processor 12.

In a case where a robot encounters the local center robot when the robot freely moves, the robot conducts robot-to-robot communication with the local center robot to construct the local network with the local center robot in the corresponding local region, wherein robots in the same local network complete the local task package corresponding to the local region cooperatively.

The local center robot assigns one or more to-be-executed tasks corresponding to the local task package to the task execution robots in the local region according to a preset task assignment rule, and each task execution robot executes at least one to-be-executed task corresponding to the task execution robot.

In an embodiment, the following operations may be further implemented when the task execution program 01 is executed by the processor 12.

The task execution robot reports the current task execution situation to the local center robot in the same local region in real time while executing the task.

After the task execution robot executes the to-be-executed task, in a case where there is still at least one to-be-executed task in the corresponding local task package in the same local region, the local center robot continuously sends at least one to-be-executed task to the task execution robot.

In a case where the one or more to-be-executed tasks in the corresponding local task package in the same local region are all completed, the local center robot moves, according to recorded location information of a communication point where the local center robot is capable of communicating with the server, to a corresponding location of the communication point, and reports that the one or more to-be-executed tasks in the local task package in the local region are all completed to the server. In this case, the local center robot is released to be the free moving robot.

In an embodiment, the following operations may be further implemented when the task execution program 01 is executed by the processor 12.

In a case where there are no other robots cooperating with the local center robot to complete the one or more to-be-executed tasks within a preset duration after the local center robot acquires the local task package, the local center robot moves, according to recorded location information of a communication point where the local center robot is capable of communicating with the server, to a corresponding location of the communication point, and feeds back, to the server, that the one or more to-be-executed tasks in the local region are unable to be executed, so as to release the one or more to-be-executed tasks corresponding to the local region.

According to the electronic device in the present disclosure, the entire region of the warehouse is partitioned to obtain at least one local region corresponding to the partitioned warehouse. The capability feature information that is reported by each robot moving freely within the current warehouse range after the robot comes online is received. The local center robot is determined according to the capability feature information reported by the robot, and the corresponding to-be-executed task is assigned to the local region obtained via partitioning, so that one or more robots freely constructing a local network execute the one or more to-be-executed tasks. The task completion information reported by a robot is received after the one or more robots complete the one or more to-be-executed tasks, and the robot which has reported the task completion information is released to be the free moving robot. Therefore, the robots in different locations in the warehouse can work efficiently and the overall task execution efficiency can be increased without additional costs.

In addition, an embodiment of the present disclosure further provides a computer storage medium. The computer storage medium stores a task execution program. The task execution program may be executed by one or more processors to implement the following operations.

An entire region of a warehouse is partitioned to obtain at least one local region corresponding to the partitioned warehouse.

The capability feature information that is reported by each robot moving freely within a current warehouse range after the robot comes online is received.

A local center robot is determined according to the capability feature information reported by the robot, and a corresponding to-be-executed task is assigned to the local region obtained via partitioning, so that one or more robots freely constructing a local network execute the one or more to-be-executed tasks.

Task completion information reported by the robot is received after the one or more robots complete the one or more to-be-executed tasks, and the robot which has reported the task completion information is released to be a free moving robot.

The specific implementation of the computer-readable storage medium of the present disclosure is basically the same as the implementation principle of each embodiment corresponding to the task execution method and apparatus for robots capable of freely constructing a network and the electronic device, which is not described herein again.

Persons skilled in the art should understand that the embodiments of the present disclosure may be provided as a method, a system, or a computer program product. Therefore, the present disclosure may adopt forms of complete hardware embodiments, complete software embodiments or embodiments integrating software and hardware.

It is apparent that those skilled in the art can make various modifications and variations to the present disclosure without departing from the spirit and scope of the present disclosure. Thus, if such modifications and variations of the present disclosure fall within the scope of the appended claims and their equivalents, the present disclosure is also intended to cover the modifications and variations.

INDUSTRIAL APPLICABILITY

According to the embodiments of the present disclosure, the entire region of the warehouse is partitioned to obtain at least one local region corresponding to the partitioned warehouse. The capability feature information that is reported by each robot moving freely within the current warehouse range after the robot comes online is received. The local center robot is determined according to the capability feature information reported by the robot, and the corresponding to-be-executed task is assigned to the local region obtained via partitioning, so that one or more robots freely constructing a local network execute the one or more to-be-executed tasks. The task completion information reported by a robot is received after the one or more robots complete the one or more to-be-executed tasks, and the robot which has reported the task completion information is released to be the free moving robot. Therefore, the robots in different locations in the warehouse can work efficiently and the overall task execution efficiency can be increased without additional costs.

The invention claimed is:

1. A task execution method for robots capable of freely constructing a network, comprising:
    partitioning, by a server, an entire region of a warehouse to obtain one or more local regions corresponding to the partitioned warehouse;
    receiving, by the server, capability feature information that is reported by each robot moving freely within a current warehouse range after each robot comes online;
    respectively determining, by the server according to the capability feature information reported by each robot and a preset assignment rule, a local center robot for a respective one of the one or more local regions corresponding to the partitioned warehouse; assigning one or more to-be-executed tasks corresponding to the respective one of the one or more local regions obtained via partitioning; sending, by the server, a local task package formed by the one or more to-be-executed tasks to the local center robot assigned for the respective one of the one or more local regions; and assigning, by the local center robot, at least one of the one or more to-be-executed tasks to each of task execution robots, other than the local center robot, in the respective one of the one or more local regions, wherein a local network is constructed among the local center robot and the task execution robots in a same local region so that a current task execution situation is reported via the local network by each of the task execution robots to the local center robot in the same local region in real time while each of the task execution robots executes the at least one to-be-executed task corresponding to the task execution robot; and receiving, by the server, task completion information reported by the local center robot after the one or more to-be-executed tasks are completed, and releasing the local center robot which has reported the task completion information to be a free moving robot.

2. The task execution method for robots capable of freely constructing a network according to claim 1, further comprising:

detecting, by each robot, a network communication situation when each robot freely moves within the current warehouse range after each robot comes online, acquiring communication information between each robot and the server and between each robot and other robots to obtain the capability feature information of each robot, and reporting the obtained capability feature information to the server; and recording, by each robot, location information of a communication point where each robot is capable of communicating with the server.

3. The task execution method for robots capable of freely constructing a network according to claim 2, wherein detecting, by each robot, the network communication situation when each robot freely moves within the current warehouse range after each robot comes online, acquiring communication information between each robot and the server and between each robot and other robots to obtain the capability feature information of each robot comprises:

detecting, by each robot, a network condition while each robot is online and freely moves within the current warehouse range, attempting to conduct communication with the server, and at the same time communicating with the other robots according to a preset robot-to-robot communication manner; and acquiring the capability feature information of each robot according to the communication information between each robot and the server and between each robot and the other robots.

4. A non-transitory computer storage medium, having a task execution program stored thereon, wherein the task execution program is executed by one or more processors to implement operations of the task execution method for robots capable of freely constructing a network according to claim 3.

5. The task execution method for robots capable of freely constructing a network according to claim 2, further comprising:

recording, by each robot, a strength of a communication signal when communicating with the server.

6. A non-transitory computer storage medium, having a task execution program stored thereon, wherein the task execution program is executed by one or more processors to implement operations of the task execution method for robots capable of freely constructing a network according to claim 2.

7. The task execution method for robots capable of freely constructing a network according to claim 1, wherein partitioning, by the server, the entire region of the warehouse to obtain the one or more local regions corresponding to the partitioned warehouse comprises:

partitioning, by the server, the entire region of the warehouse to obtain the one or more local regions corresponding to the partitioned warehouse according to a warehouse range where each robot currently works and communication capability information of each robot.

8. The task execution method for robots capable of freely constructing a network according to claim 1, wherein the capability feature information comprises types of tasks that each robot is able to accept, and a current health condition of each robot.

9. An electronic device, comprising a memory and a processor, wherein the memory stores a task execution program executable on the processor; and when the task execution program is executed by the processor, the task execution method for robots capable of freely constructing a network according to claim 1 is executed.

10. A non-transitory computer storage medium, having a task execution program stored thereon, wherein the task execution program is executed by one or more processors to implement operations of the task execution method for robots capable of freely constructing a network according to claim 1.

11. The task execution method for robots capable of freely constructing a network according to claim 1, further comprising:

in a case where a robot encounters the local center robot when the robot freely moves, conducting, by the robot, robot-to-robot communication with the local center robot to construct the local network with the local center robot in the corresponding local region and become one of the task execution robots in the corresponding local region, wherein the local center robot and the task execution robots in the same local network complete the local task package corresponding to the corresponding local region cooperatively; and assigning, by the local center robot, the at least one of the one or more to-be-executed tasks corresponding to the local task package to each of the task execution robots in the corresponding local region according to a preset task assignment rule, and executing, by each of the task execution robots, the at least one to-be-executed task corresponding to the task execution robot.

12. The task execution method for robots capable of freely constructing a network according to claim 11, further comprising:

after a task execution robot completes the at least one to-be-executed task corresponding to the task execution robot, in a case where there is still at least one to-be-executed task in the corresponding local task package in the same local region, continuously sending, by the local center robot, at least one more to-be-executed task to the task execution robot; and in a case where the one or more to-be-executed tasks in the corresponding local task package in the same local region are all completed, moving, by the local center robot according to recorded location information of a communication point where the local center robot is capable of communicating with the server, to a corresponding location of the communication point, and reporting that the one or more to-be-executed tasks in the local task package in the local region are all completed to the server, wherein after reporting that the one or more to-be-executed tasks in the local task package in the local region are all completed to the server, the local center robot is released to be the free moving robot.

13. A non-transitory computer storage medium, having a task execution program stored thereon, wherein the task execution program is executed by one or more processors to implement operations of the task execution method for robots capable of freely constructing a network according to claim 12.

14. The task execution method for robots capable of freely constructing a network according to claim 11, further comprising:
  in a case where there are no other task execution robots cooperating with the local center robot to complete the one or more to-be-executed tasks within a preset duration after the local center robot acquires the local task package, moving, by the local center robot according to recorded location information of a communication point where the local center robot is capable of communicating with the server, to a corresponding location of the communication point, and feeding back, to the server, that the one or more to-be-executed tasks in the corresponding local region are unable to be executed, so as to release the one or more to-be-executed tasks corresponding to the corresponding local region.

15. A non-transitory computer storage medium, having a task execution program stored thereon, wherein the task execution program is executed by one or more processors to implement operations of the task execution method for robots capable of freely constructing a network according to claim 11.

16. A server, comprising a memory storing instructions and a processor in communication with the memory, wherein the processor is configured to execute the instructions to:
  partition an entire region of a warehouse to obtain one or more local regions corresponding to the partitioned warehouse;
  receive capability feature information that is reported by each robot moving freely within a current warehouse range after each robot comes online; respectively determine, according to the capability feature information reported by each robot and a preset assignment rule, a local center robot for a respective one of the one or more local regions corresponding to the partitioned warehouse; assign one or more to-be-executed tasks corresponding to the respective one of the one or more local regions obtained via partitioning; and send a local task package comprising the one or more to-be-executed tasks to the local center robot assigned for the respective one of the one or more local regions, so that the local center robot assigns at least one of the one or more to-be-executed tasks to each of task execution robots, other than the local center robot, in the respective one of the one or more local regions, wherein a local network is constructed among the local center robot and the task execution robots in a same local region so that a current task execution situation is reported via the local network by each of the task execution robots to the local center robot in the same local region in real time while each of the task execution robots executes the at least one to-be-executed task corresponding to the task execution robot; and
  receive task completion information reported by the local center robot after the one or more to-be-executed tasks are completed, and release the local center robot which has reported the task completion information to be a free moving robot.

17. The task execution apparatus for robots capable of freely constructing a network according to claim 16, wherein the processor, when configured to partition the entire region of the warehouse to obtain the one or more local regions corresponding to the partitioned warehouse, is configured to execute the instructions to:
  partition the entire region of the warehouse to obtain the one or more local regions corresponding to the partitioned warehouse according to a warehouse range where each robot currently works and communication capability information of each robot.

* * * * *